(12) United States Patent
Jyousaka et al.

(10) Patent No.: US 7,715,952 B2
(45) Date of Patent: May 11, 2010

(54) TEMPERATURE SETTING OF THERMAL PROCESSING PLATE USING ZERNIKE COEFFICIENTS

(75) Inventors: Megumi Jyousaka, Koshi (JP); Hiroshi Tomita, Koshi (JP); Masahide Tadokoro, Koshi (JP)

(73) Assignee: Tokyo Electron Limited, Tokyo (JP)

( * ) Notice: Subject to any disclaimer, the term of this patent is extended or adjusted under 35 U.S.C. 154(b) by 405 days.

(21) Appl. No.: 11/858,784

(22) Filed: Sep. 20, 2007

(65) Prior Publication Data
US 2009/0082911 A1     Mar. 26, 2009

(51) Int. Cl.
   *G05D 17/00*    (2006.01)
   *G06F 17/50*    (2006.01)
(52) U.S. Cl. ............... 700/300; 219/444.1; 219/448.11; 219/448.12; 219/483; 219/494
(58) Field of Classification Search ................. 700/300; 219/444.1, 448.11, 448.12, 483, 494
   See application file for complete search history.

(56) References Cited

U.S. PATENT DOCUMENTS

| | | | |
|---|---|---|---|
| 6,457,882 B2 | 10/2002 | Ogata et al. | |
| 6,639,651 B2 * | 10/2003 | Matsuyama | 355/52 |
| 6,646,729 B2 * | 11/2003 | van der Laan et al. | 356/124 |
| 6,829,039 B2 * | 12/2004 | Endo et al. | 355/53 |
| 7,221,430 B2 * | 5/2007 | Van Dijck et al. | 355/30 |
| 7,355,695 B2 * | 4/2008 | Liang et al. | 356/243.1 |
| 7,444,615 B2 * | 10/2008 | Percin et al. | 716/19 |

FOREIGN PATENT DOCUMENTS

JP     2001-143850     5/2001

OTHER PUBLICATIONS

"Thermal Test: Random Temperature Distribution", Columbus Project, Report N. 111 Rev. 0, Milano, 1988, Apr. 30.*

* cited by examiner

*Primary Examiner*—Michael D Masinick
(74) *Attorney, Agent, or Firm*—Oblon, Spivak, McClelland, Maier & Neustadt, L.L.P.

(57) ABSTRACT

In the present invention, a thermal plate is divided into a plurality of thermal plate regions, and a temperature is settable for each of the thermal plate regions. A temperature correction value for adjusting the temperature within the thermal plate is settable for each of the thermal plate regions of the thermal plate. The line widths within the wafer for which the photolithography process has been finished are first measured, and Zernike coefficients of a Zernike polynomial indicating a plurality of in-plane tendency components are calculated from the measured values of the line widths within the wafer. Then, the temperature correction values for the regions of the thermal plate to bring the calculated Zernike coefficients close to 0 are calculated using a calculation model indicating a correlation between change amounts of the Zernike coefficients and the temperature correction values. The temperature of each of the regions of the thermal plate is set based on each of the calculated temperature correction values.

17 Claims, 11 Drawing Sheets

$$M = \begin{pmatrix} M_{11}, M_{12}, & \cdots & M_{1m} \\ M_{21}, M_{22}, & \cdots & M_{2m} \\ \vdots & \ddots & \vdots \\ M_{n1}, M_{n2}, & \cdots & M_{nm} \end{pmatrix}$$

FIG.11

```
┌─────────────────────────────┐
│ MEASUREMENT OF LINE WIDTH OF│── S1
│ RESIST PATTERN WITHIN WAFER │
└─────────────────────────────┘
              ↓
┌─────────────────────────────┐
│   CALCULATION OF ZERNIKE    │── S2
│        COEFFICIENT          │
└─────────────────────────────┘
              ↓
┌─────────────────────────────┐
│ CALCULATION OF TEMPERATURE  │
│  CORRECTION VALUE USING     │── S3
│    CALCULATION MODEL M      │
└─────────────────────────────┘
              ↓
┌─────────────────────────────┐
│   SETTING OF TEMPERATURE    │── S4
│     CORRECTION VALUE        │
└─────────────────────────────┘
```

FIG.12

$$\begin{pmatrix} \Delta Z_1 \\ \Delta Z_2 \\ \vdots \\ \Delta Z_n \end{pmatrix} = M \begin{pmatrix} \Delta T_1 \\ \Delta T_2 \\ \Delta T_3 \\ \Delta T_4 \\ \Delta T_5 \end{pmatrix} \quad \cdots\cdots (1)$$

FIG.13

| PROCESSING RECIPE | CALCULATION MODEL | HEATING TEMPERATURE | RESIST SOLUTION | THERMAL PLATE TEMPERATURE CORRECTION VALUE ΔT | | | | |
|---|---|---|---|---|---|---|---|---|
| | | | | REGION 1 | REGION 2 | REGION 3 | REGION 4 | REGION 5 |
| H | M1 | T1 | B1 | a1 | a2 | a3 | a4 | a5 |
| I | M2 | T1 | B2 | b1 | b2 | b3 | b4 | b5 |
| J | M3 | T2 | B1 | c1 | c2 | c3 | c4 | c5 |
| K | M4 | T2 | B2 | d1 | d2 | d3 | d4 | d5 |

TEMPERATURE SETTING OF THERMAL PROCESSING PLATE USING ZERNIKE COEFFICIENTS

BACKGROUND OF THE INVENTION

1. Field of the Invention

The present invention relates to a temperature setting method of a thermal processing plate, a computer-readable recording medium recording a program thereon, and a temperature setting apparatus for a thermal processing plate.

2. Description of the Related Art

In a photolithography process in manufacturing, for example, a semiconductor device, for example, a resist coating treatment for applying a resist solution onto a wafer to form a resist film, exposure processing for exposing the resist film into a predetermined pattern, heating processing for accelerating the chemical reaction in the resist film after exposure (post-exposure baking), and developing treatment for developing the exposed resist film are performed in sequence, so that the series of wafer processing forms a predetermined resist pattern on the wafer.

For example, the heating processing such as the above-described post-exposure baking is usually performed in a heating processing apparatus. The heating processing apparatus includes a thermal plate for mounting and heating the wafer thereon. The thermal plate has a heater embedded therein which generates heat by power feeding, and the heat generated by the heater adjusts the thermal plate to a predetermined temperature.

The thermal processing temperature in the above-described heating processing greatly affects the line width of the resist pattern to be finally formed on the wafer. Hence, to strictly control the temperature within the wafer during heating, the thermal plate of the above-described heating processing apparatus is divided into a plurality of regions, and an independent heater is embedded in each of the regions to adjust the temperature for each of the regions.

It is known that if the temperature adjustment for all of the regions of the above-described thermal plate is performed at the same set temperature, the temperature may vary within the wafer on the thermal plate, for example, due to the difference in thermal resistance between the regions, resulting in variations in the line width of the resist pattern. For this reason, the set temperatures for the regions of the thermal plate are subjected to temperature correction (temperature offset), and the temperature correction values for the regions are set to make the temperature uniform within the wafer (see Japanese Patent Application Laid-open No. 2001-143850).

However, even if the temperature correction values are set to make the temperature uniform within the wafer as in the prior art, the resist pattern is actually not formed with the sufficiently uniform line width. As described above, the conventional temperature setting method of the thermal plate has limitations in uniforming the line width of the resist pattern.

SUMMARY OF THE INVENTION

The present invention has been developed in consideration of the above points, and its object is to perform temperature setting of a thermal processing plate such as a thermal plate so that the final processing state of a substrate such as the line width of a resist pattern or the like of a wafer within the substrate is made more uniform than that in the prior art.

To achieve the above object, in the present invention, the thermal processing plate is divided into a plurality of regions, and a temperature is settable for each of the regions, and a temperature correction value for adjusting an in-plane temperature of the thermal processing plate is settable for each of the regions of the thermal processing plate. The present invention includes the steps of measuring a processing state within a substrate, for a substrate for which a series of substrate processing including the thermal processing has been finished; calculating Zernike coefficients of a Zernike polynomial indicating a plurality of in-plane tendency components of the processing state of the substrate based on the measured values of the processing state within the substrate; calculating the temperature correction values for the regions of the thermal processing plate to bring the calculated Zernike coefficients close to 0 (zero) using a calculation model indicating a correlation between change amounts of the Zernike coefficients indicating the plurality of in-plane tendency components and the temperature correction values; and setting the temperature of each of the regions of the thermal processing plate based on each of the calculated temperature correction values.

Note that the "in-plane tendency components" refer to a plurality of components indicating the in-plane tendency of the processing state of the substrate.

According to the present invention, the Zernike coefficients indicating a plurality of in-plane tendency components are calculated from the final processing state of the substrate, the temperature correction values for the regions of the thermal processing plate are calculated to bring the Zernike coefficients close to 0 using the calculation model, and the thermal plate temperature of each of the regions is corrected based on the temperature correction value, so that the in-plane tendency of the processing state of the substrate can be removed to uniform the substrate processing state within the substrate.

Further, since the Zernike coefficients of a Zernike polynomial are used, the processing state within the substrate can be decomposed into many in-plane tendency components so that the in-plane tendency components which can be improved by the temperature setting of the thermal processing plate can be appropriately grasped and eliminated, thereby drastically improving the uniformity of the final processing state within the wafer.

The calculation model may be a determinant expressing variation mounts of the plurality of in-plane tendency components when the temperature of each of the regions of the thermal processing plate is raised by 1° C., by the Zernike coefficients of the Zernike polynomial.

The series of substrate processing may be processing to form a resist pattern on the substrate in a photolithography process. Further, the processing state of the substrate to be measured may be a line width of a resist pattern. Furthermore, the thermal processing may be heating processing performed after exposure processing and before developing treatment.

The calculation model may be separated into a coefficient component determined by a resist solution and a model component determined by a processing condition other than the resist solution.

The model component may be further separated into a first model component determined by an exposure processing condition in the photolithography process and a second model component determined by a processing condition other than the exposure processing condition.

The temperature correction value for each of the regions may be set for each processing recipe determined by a combination of at least the thermal processing temperature and the kind of the resist solution.

The present invention according to another aspect is a computer-readable recording medium recording a program thereon for causing a computer to execute a temperature setting method of a thermal processing plate.

The present invention according to still another aspect is a temperature setting apparatus for a thermal processing plate for mounting and thermally processing a substrate thereon. The thermal processing plate is divided into a plurality of regions, and a temperature is settable for each of the regions, and a temperature correction value for adjusting an in-plane temperature of the thermal processing plate is settable for each of the regions of the thermal processing plate. The apparatus includes a controller for calculating Zernike coefficients of a Zernike polynomial indicating a plurality of in-plane tendency components of the processing state of a substrate based on the processing state within the substrate, for a substrate for which a series of substrate processing including the thermal processing has been finished; calculating the temperature correction values for the regions of the thermal processing plate to bring the calculated Zernike coefficients close to 0 (zero) using a calculation model indicating a correlation between change amounts of the Zernike coefficients indicating the plurality of in-plane tendency components and the temperature correction values; and setting the temperature of each of the regions of the thermal processing plate based on each of the calculated temperature correction values.

According to the present invention, the uniformity within the substrate of the final processing state of the substrate is improved as compared to that in the prior art, resulting in increased yields.

BRIEF DESCRIPTION OF THE DRAWINGS

FIG. 11 is a flowchart showing a temperature setting process;

FIG. 12 is a relational expression of the calculation model into which the adjustment amount of each Zernike coefficient and temperature correction value are substituted; and FIG. 13 is a table showing a temperature correction table when setting the calculation model and the temperature correction value for each processing recipe.

DETAILED DESCRIPTION OF THE INVENTION

Figure 1:
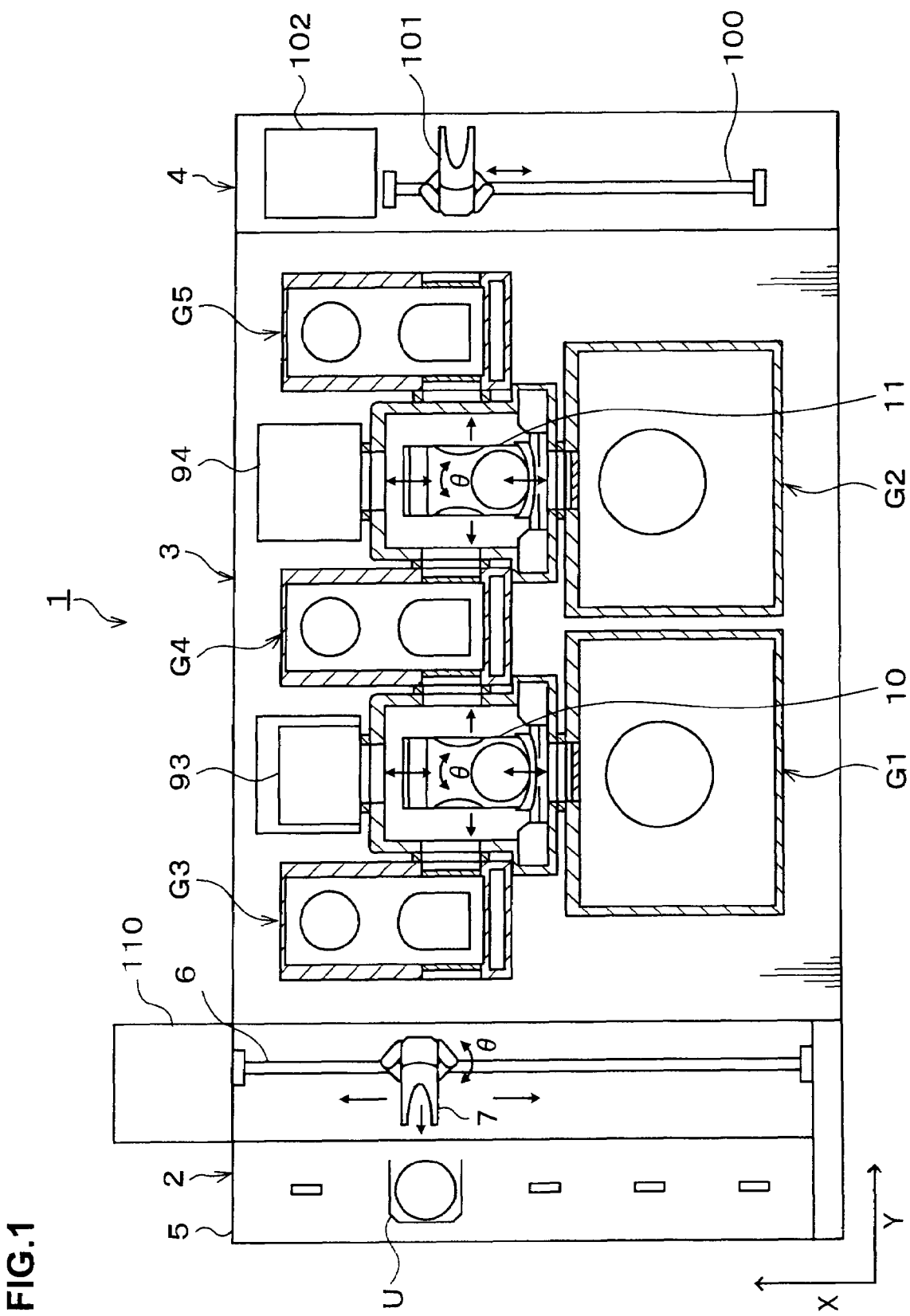
FIG. 1 is a plan view showing the outline of a configuration of a coating and developing treatment system.
Figure 2:
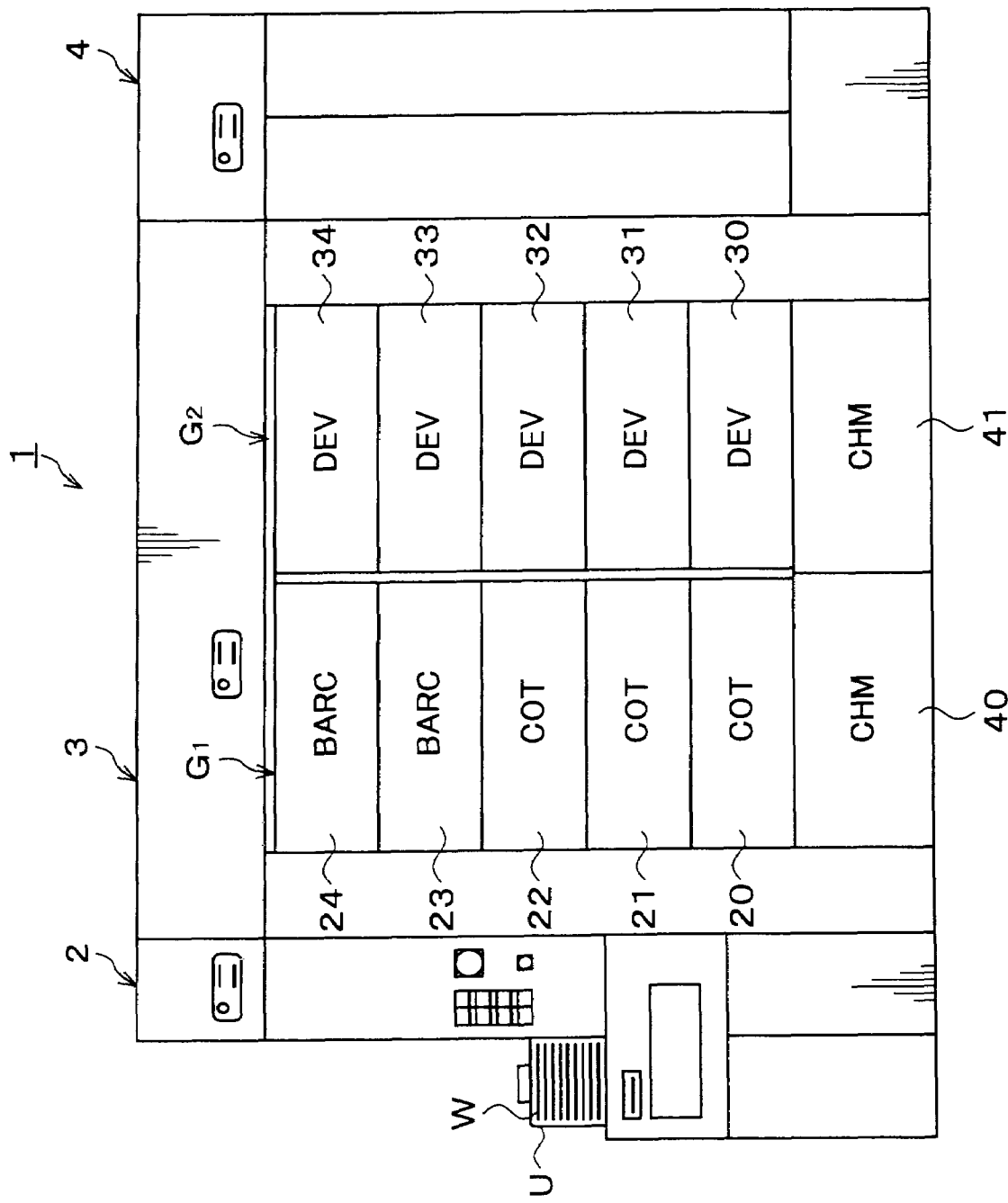
FIG. 2 is a front view of the coating and developing treatment system in FIG. 1.
Figure 3:
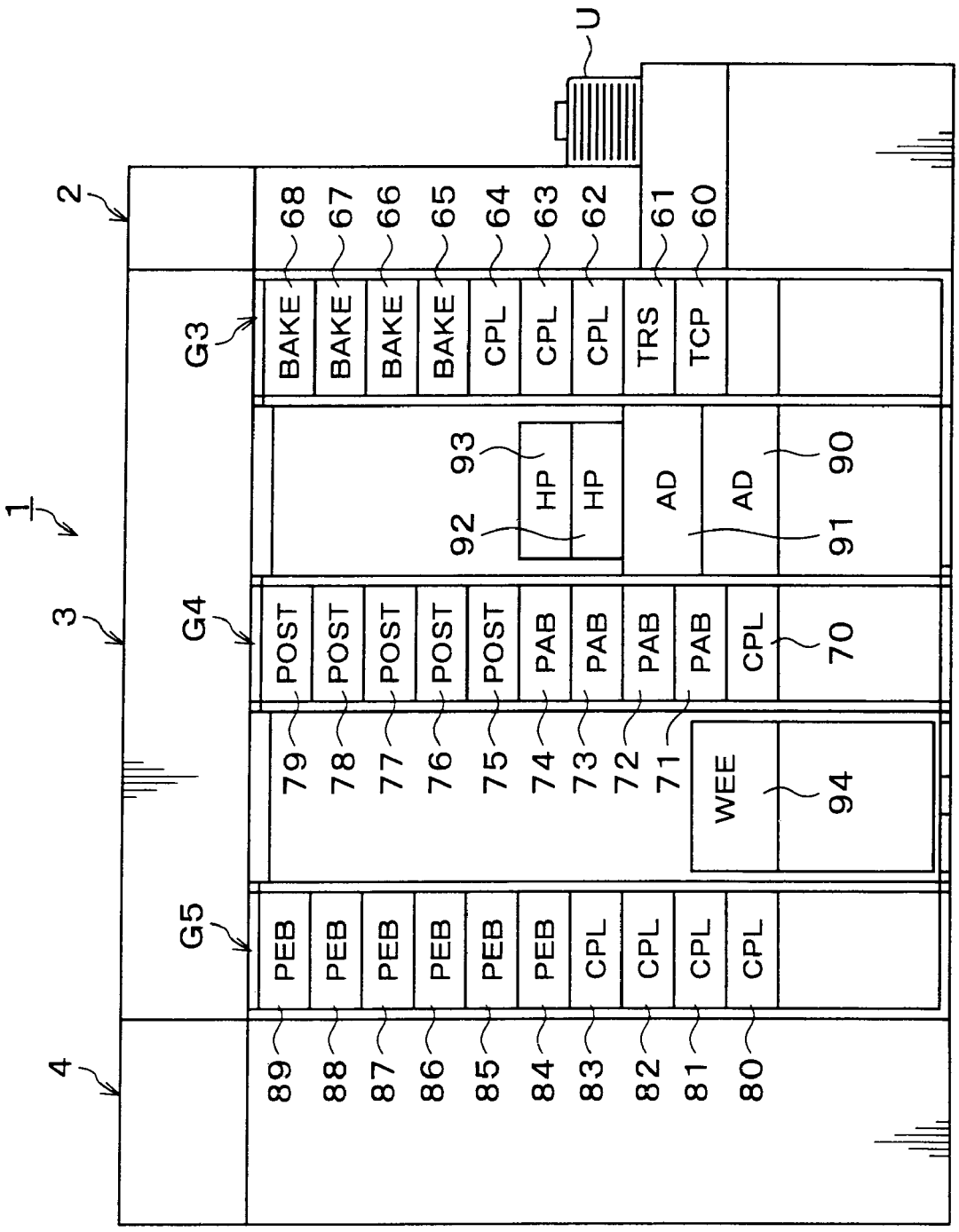
FIG. 3 is a rear view of the coating and developing treatment system in FIG. 1.

Hereinafter, a preferred embodiment of the present invention will be described. FIG. 1 is a plan view showing the outline of a configuration of a coating and developing treatment system 1 incorporating a temperature setting apparatus for a thermal processing plate according to the embodiment, FIG. 2 is a front view of the coating and developing treatment system 1, and FIG. 3 is a rear view of the coating and developing treatment system 1.

The coating and developing treatment system 1 has, as shown in FIG. 1, a configuration in which, for example, a cassette station 2 for transferring, for example, 25 wafers W per cassette as a unit from/to the outside into/from the coating and developing treatment system 1 and transferring the wafers W into/out of a cassette U; a processing station 3 including a plurality of various kinds of processing and treatment units, which are multi-tiered, for performing predetermined processing or treatment in a manner of single wafer processing in the photolithography process; and an interface section 4 for delivering the wafers W to/from a not-shown aligner provided adjacent to the processing station 3, are integrally connected together.

In the cassette station 2, a cassette mounting table 5 is provided and configured such that a plurality of cassettes U can be mounted thereon in a line in an X-direction (a top-to-bottom direction in FIG. 1). In the cassette station 2, a wafer transfer body 7 is provided which is movable in the X-direction on a transfer path 6. The wafer transfer body 7 is also movable in an arrangement direction of the wafers W housed in the cassette U (a Z-direction; the vertical direction), and thus can selectively access the wafers W in each of the cassettes U.

The wafer transfer body 7 is rotatable in a O-direction around a Z-axis, and can access a temperature regulating unit 60 and a transition unit 61 included in a later-described third processing unit group G3 on the processing station 3 side.

The processing station 3 adjacent to the cassette station 2 includes, for example, five processing unit groups G1 to G5 in each of which a plurality of processing and treatment units are multi-tiered. On the side of the negative direction in the X-direction (the downward direction in FIG. 1) in the processing station 3, the first processing unit group G1 and the second processing unit group G2 are placed in order from the cassette station 2 side. On the side of the positive direction in the X-direction (the upward direction in FIG. 1) in the processing station 3, the third processing unit group G3, the fourth processing unit group G4, and the fifth processing unit group G5 are placed in order from the cassette station 2 side. Between the third processing unit group G3 and the fourth processing unit group G4, a first transfer unit 10 is provided. The first transfer unit 10 can selectively access the processing and treatment units in the first processing unit group G1, the third processing unit group G3, and the fourth processing unit group G4 and transfer the wafer W to them. Between the fourth processing unit group G4 and the fifth processing unit group G5, a second transfer unit 11 is provided. The second transfer unit 11 can selectively access the processing and treatment units in the second processing unit group G2, the fourth processing unit group G4, and the fifth processing unit group G5 and transfer the wafer W to them.

In the first processing unit group G1, as shown in FIG. 2, solution treatment units each for supplying a predetermined liquid to the wafer W to perform treatment, for example, resist coating units 20, 21, and 22 each for applying a resist solution to the wafer W, and bottom coating units 23 and 24 each for forming an anti-reflection film that prevents reflection of light at the time of exposure processing, are five-tiered in order from the bottom. In the second processing unit group G2, solution treatment units, for example, developing treatment units 30 to 34 each for supplying a developing solution to the wafer W to develop it are five-tiered in order from the bottom.

Further, chemical chambers 40 and 41 for supplying various kinds of treatment solutions to the solution treatment units in the processing unit groups G1 and G2 are provided at the lowermost tiers of the first processing unit group G1 and the second processing unit group G2, respectively.

As shown in FIG. 3, in the third processing unit group G3, for example, the temperature regulating unit 60, the transition unit 61 for passing the wafer W, high-precision temperature regulating units 62 to 64 each for regulating the wafer temperature under a high precision temperature control, and high-temperature thermal processing units 65 to 68 each for heat-processing the wafer W at a high temperature, are nine-tiered in order from the bottom.

In the fourth processing unit group G4, for example, a high-precision temperature regulating unit 70, pre-baking units 71 to 74 each for heat-processing the wafer W after resist coating treatment, and post-baking units 75 to 79 each for heat-processing the wafer W after developing treatment, are ten-tiered in order from the bottom.

In the fifth processing unit group G5, a plurality of thermal processing units each for thermally processing the wafer W, for example, high-precision temperature regulating units 80 to 83, and post-exposure baking units (hereinafter, referred to as "PEB units") 84 to 89 each for heat-processing the wafer W after exposure and before development, are ten-tiered in order from the bottom.

As shown in FIG. 1, on the positive direction side in the X-direction to the first transfer unit 10, a plurality of processing and treatment units are arranged, for example, adhesion units 90 and 91 each for performing hydrophobic treatment on the wafer W and heating units 92 and 93 each for heating the wafer W being four-tiered in order from the bottom as shown in FIG. 3. As shown in FIG. 1, on the positive side in the X-direction to the second transfer unit 11, for example, an edge exposure unit 94 is disposed which selectively exposes only the edge portion of the wafer W to light.

In the interface section 4, for example, a wafer transfer body 101 moving on a transfer path 100 extending in the X-direction and a buffer cassette 102 are provided as shown in FIG. 1. The wafer transfer body 101 is movable in the vertical direction and also rotatable in the O-direction, and thus can access the not-shown aligner adjacent to the interface section 4, the buffer cassette 102, and the fifth processing unit group G5 and transfer the wafer W to them.

Figure 4:
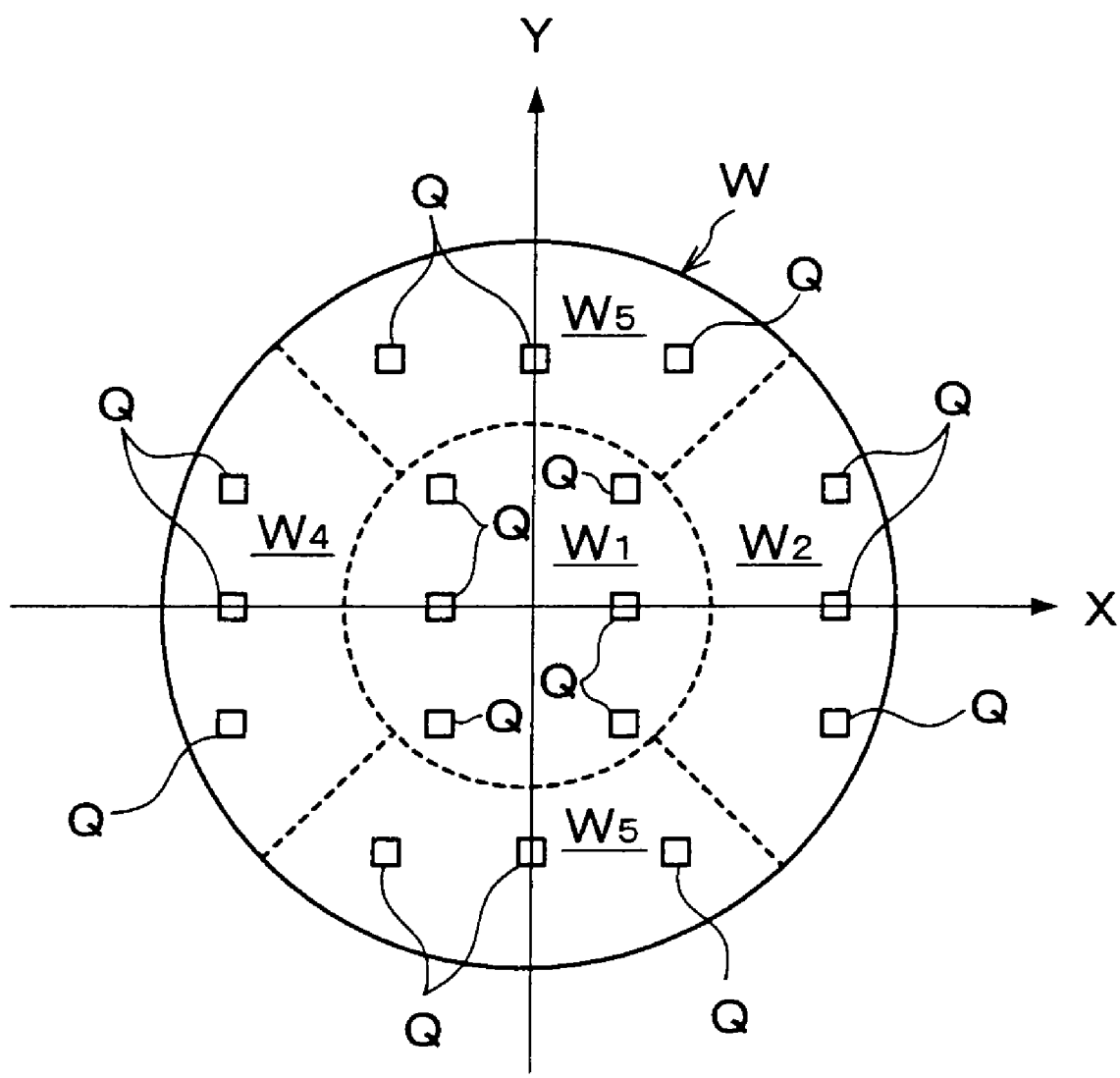
FIG. 4 is an explanatory view showing measurement points of the line width within a wafer.

In the cassette station 2, for example, a line width measuring unit 110 for measuring the line width of a resist pattern on the wafer W is provided. The line width measuring unit 110 can apply, for example, electron beams to the wafer W and capture the image of the surface of the wafer W to measure the line width of the resist pattern within the wafer. The line width measuring unit 110 can measure the line width at a plurality of locations within the wafer W. The line width measuring unit 110 can measure, for example, the line width at a plurality of measurement points Q for each of wafer regions $W_1$ to $W_5$ made by dividing the wafer W into a plurality of regions as shown in FIG. 4. The wafer regions $W_1$ to $W_5$ correspond to thermal plate regions $R_1$ to $R_5$ of a later-described thermal plate 140 of the PEB unit 84.

In the coating and developing treatment system 1 configured as described above, following wafer processing in the photolithography process is performed. The unprocessed wafers W are first taken out by the wafer transfer body 7 one by one from the cassette U on the cassette mounting table 5, and transferred to the temperature regulating unit 60 in the third processing unit group G3. The wafer W transferred to the temperature regulating unit 60 is temperature-regulated to a predetermined temperature, and is then transferred by the first transfer unit 10 to the bottom coating unit 23 where an anti-reflection film is formed.

The wafer W having the anti-reflection film formed thereon is transferred by the first transfer unit 10 to the heating unit 92, the high-temperature thermal processing unit 65, and the high-precision temperature regulating unit 70 in sequence so that predetermined processing is performed in each of the units. Thereafter, the wafer W is transferred to the resist coating unit 20, where a resist film is formed on the wafer W, and then transferred by the first transfer unit 10 to the pre-baking unit 71 and subjected to pre-baking. The wafer is subsequently transferred by the second transfer unit 11 to the edge exposure unit 94 and the high-precision temperature regulating unit 83 in sequence so that the wafer W is subjected to predetermined processing in each of the units.

The wafer W is then transferred by the wafer transfer body 101 in the interface section 4 to the not-shown aligner, where the wafer is exposed to light. The wafer W for which exposure processing has been finished is transferred by the wafer transfer body 101, for example, to the PEB unit 84, where the wafer W is subjected to post-exposure baking processing, and then transferred by the second transfer unit 11 to the high-precision temperature regulating unit 81, where the wafer W is temperature-regulated. The wafer W is transferred to the developing treatment unit 30, where the resist film on the wafer W is developed. The wafer W is then transferred by the second transfer unit 11 to the post-baking unit 75, where the wafer W is subjected to heating-processing, and then transferred to the high-precision temperature regulating unit 63, where the wafer W is temperature-regulated.

The wafer W is then transferred by the first transfer unit 10 to the transition unit 61 and returned to the cassette U by the wafer transfer body 7, thus completing the photolithography process being a series of wafer processing.

Figure 5:
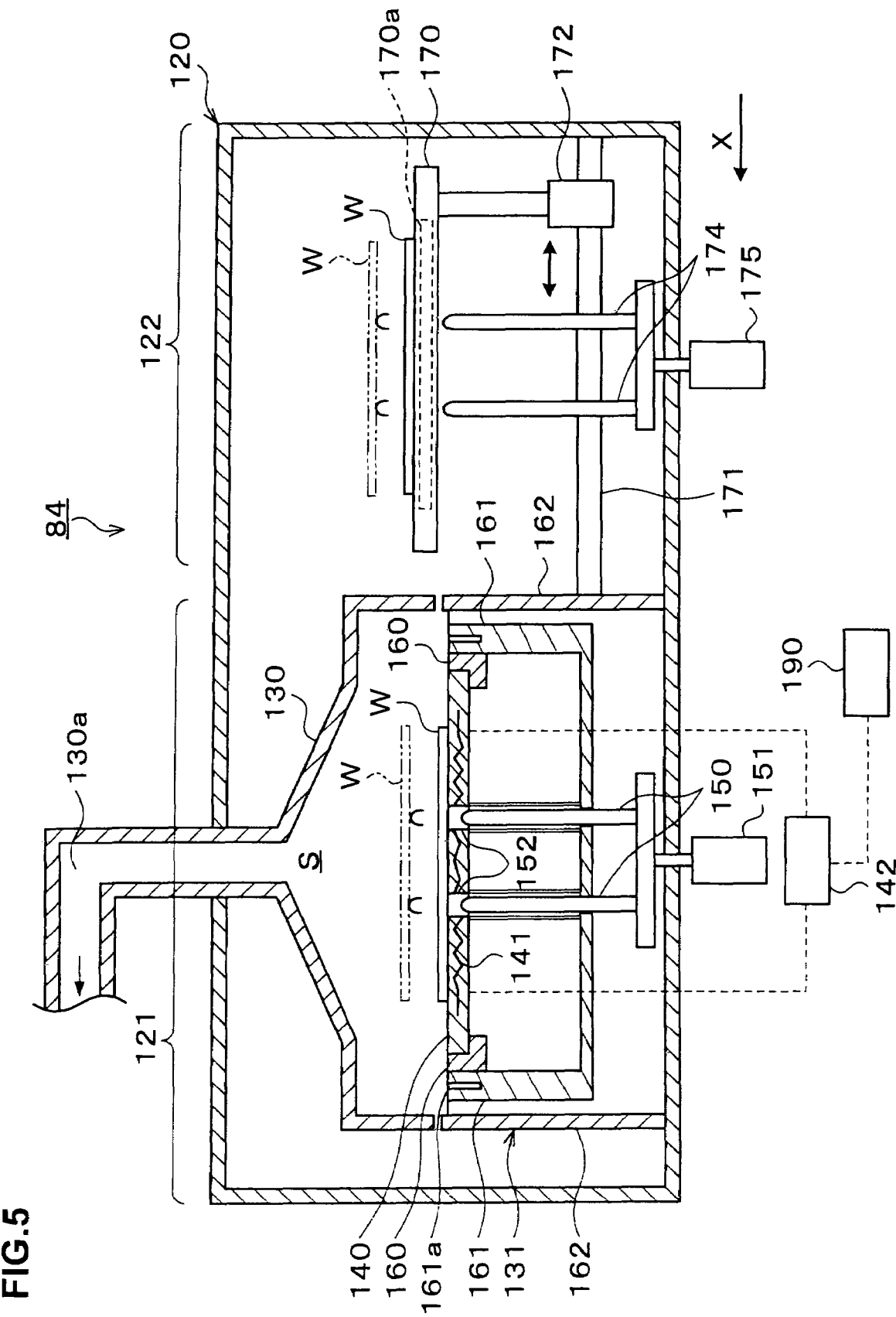
FIG. 5 is an explanatory view of a longitudinal section showing the outline of a configuration of a PEB unit.
Figure 6:
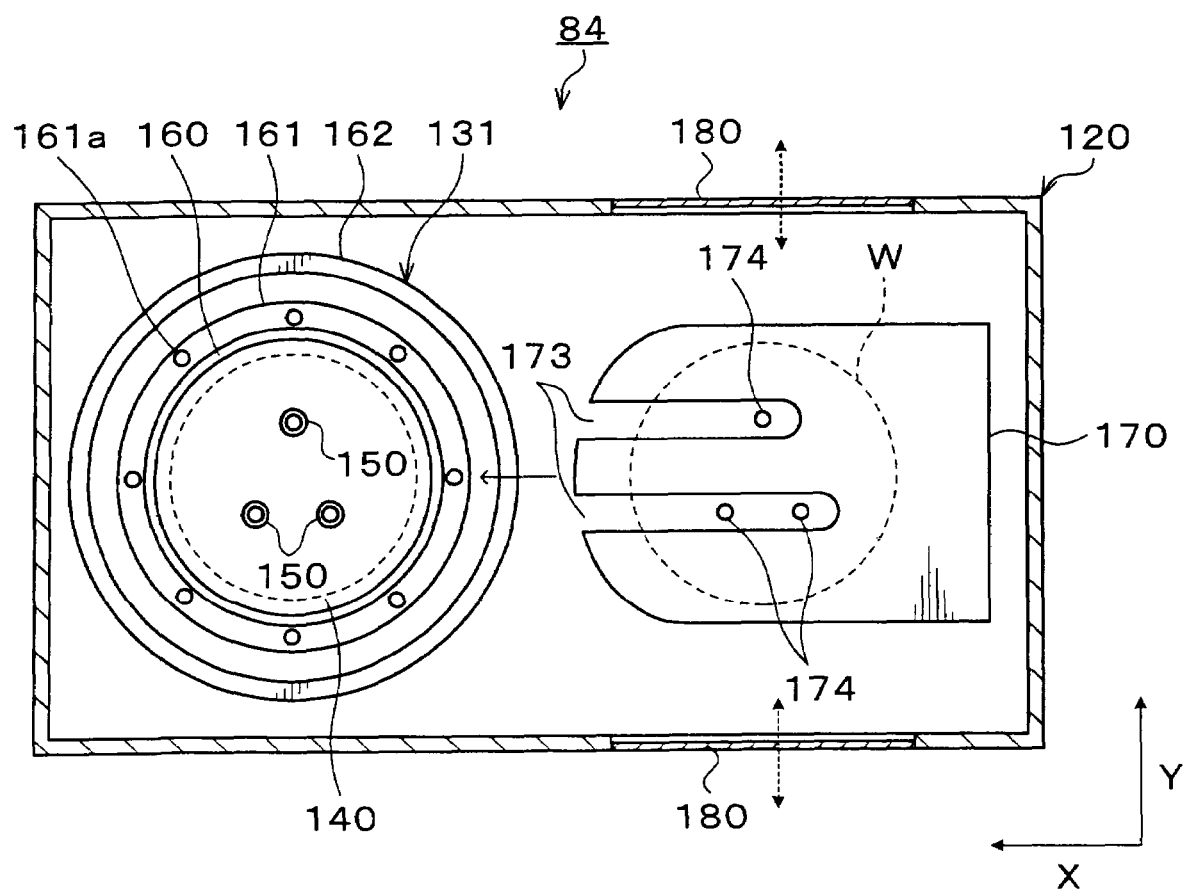
FIG. 6 is an explanatory view of a transverse section showing the outline of a configuration of the PEB unit.

Next, the configuration of the aforementioned PEB unit 84 will be described. As shown in FIG. 5 and FIG. 6, the PEB unit 84 comprises a heating section 121 for heating-processing the wafer W and a cooling section 122 for cooling-processing the wafer W in a housing 120.

The heating section 121 has, as shown in FIG. 5, a lid body 130 that is located on the upper side and vertically movable, and a thermal plate accommodating unit 131 that is located on the lower side and forms a processing chamber S together with the lid body 130.

The lid body 130 has an almost conical shape gradually increasing in height toward its central portion, and is provided with an exhaust portion 130a at its top portion. The atmosphere in the processing chamber S is uniformly exhausted through the exhaust portion 130a.

At the center of the thermal plate accommodating unit 131, a thermal plate 140 is provided as a thermal processing plate for mounting and heating the wafer W thereon. The thermal plate 140 has an almost disk shape with a large thickness.

Figure 7:
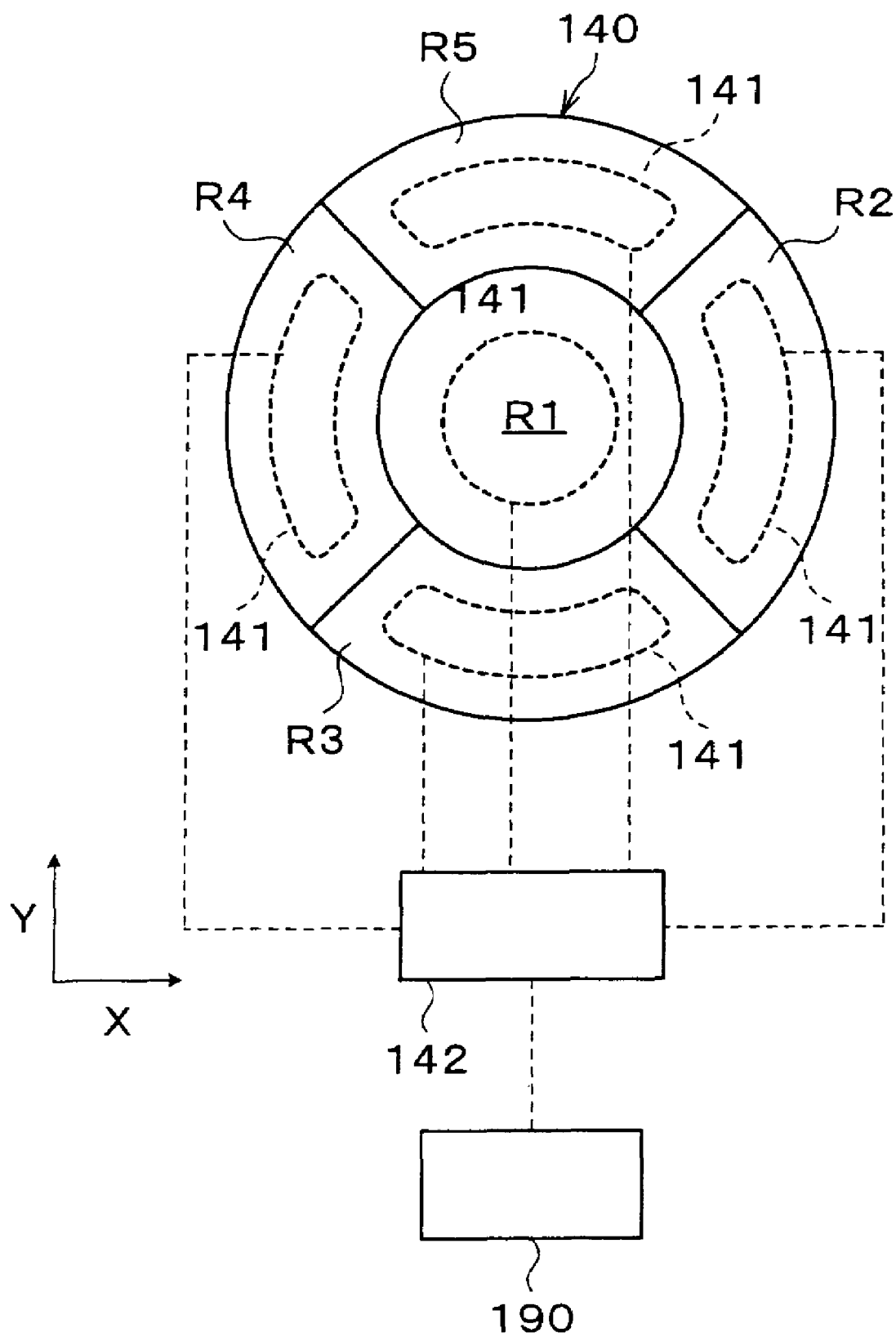
FIG. 7 is a plan view showing a configuration of a thermal plate in the PEB unit.

The thermal plate 140 is divided into a plurality of, for example, five thermal plate regions $R_1$, $R_2$, $R_3$, $R_4$ and $R_5$ as shown in FIG. 7. The thermal plate 140 is divided, for example, into the circular thermal plate region $R_1$ which is located at the central portion as seen in plan view and the thermal plate regions $R_2$ to $R_5$ which are made by equally dividing the peripheral portion around the thermal plate region $R_1$ into four sectors.

A heater 141 generating heat by power feeding is individually embedded in each of the thermal plate regions $R_1$ to $R_5$ of the thermal plate 140 and can heat each of the thermal plate regions $R_1$ to $R_5$. The heating value of each of the heaters 141 of the thermal plate regions $R_1$ to $R_5$ is adjusted, for example, by a temperature controller 142. The temperature controller 142 can adjust the heating value of the heater 141 to control the temperature of each of the thermal plate regions $R_1$ to $R_5$ to a predetermined set temperature. The temperature setting in the temperature controller 142 is performed, for example, by a later-described temperature setting apparatus 190.

As shown in FIG. 5, first raising and lowering pins 150 for supporting the wafer W from below and raising and lowering the wafer W are provided below the thermal plate 140. The first raising and lowering pins 150 are vertically movable by means of a raising and lowering drive mechanism 151. Near the central portion of the thermal plate 140, through holes 152 are formed which pass through the thermal plate 140 in its thickness direction. The first raising and lowering pins 150 can rise from below the thermal plate 140 and pass through the through holes 152 to project to above the thermal plate 140 so as to support the wafer W.

The thermal plate accommodating unit 131 has an annular holding member 160 for accommodating the thermal plate 140 and holding the outer peripheral portion of the thermal plate 140, and a support ring 161 almost in a cylindrical shape surrounding the outer periphery of the holding member 160. The upper surface of the support ring 161 is formed with blow ports 161a for jetting, for example, an inert gas toward the inside of the processing chamber S. The jetting of the inert gas from the blow ports 161a can purge the processing chamber S. Further, outside the support ring 161, a case 162 in a cylindrical shape is provided which is an outer periphery of the thermal plate accommodating unit 131.

In the cooling section 122 adjacent to the heating section 121, for example, a cooling plate 170 is provided which mounts and cools the wafer W thereon. The cooling plate 170 has, for example, an almost square flat-plate shape as shown in FIG. 6 with its end face on the heating section 121 side curved in an arc shape. As shown in FIG. 5, inside the cooling plate 170, for example, a cooling member 170a such as a Peltier element is embedded and can adjust the cooling plate 170 to a predetermined set temperature.

The cooling plate 170 is attached to a rail 171 extending toward the heating section 121 side. The cooling plate 170 can move on the rail 171 by means of a drive unit 172 to a position above the thermal plate 140 on the heating section 121 side.

The cooling plate 170 is formed with, for example, two slits 173 along the X-direction, for example, as shown in FIG. 6. The slits 173 are formed from the end surface on the heating section 121 side of the cooling plate 170 to the vicinity of the central portion of the cooling plate 170. The slits 173 prevent the cooling plate 170 which has moved to the heating section 121 side from interfering with the first raising and lowering pins 150 projecting to above the thermal plate 140. As shown in FIG. 5, second raising and lowering pins 174 are provided below the cooling plate 170 in the cooling section 122. The second raising and lowering pins 174 can be raised and lowered by a raising and lowering drive unit 175. The second raising and lowering pins 174 can rise from below the cooling plate 170 and pass through the slits 173 to project to above the cooling plate 170 so as to support the wafer W.

As shown in FIG. 6, both side surfaces of the housing 120 across the cooling plate 170 are formed with transfer-in/out ports 180 for transferring-in/out the wafer W.

In the PEB unit 84 configured as described above, a wafer W is first transferred-in through the transfer-in/out port 180 and mounted on the cooling plate 170. The cooling plate 170 is subsequently moved so that the wafer W is moved to a position above the thermal plate 140. The wafer W is mounted onto the thermal plate 140 by the first raising and lowering pins 150, so that the wafer W is heated. After a lapse of a predetermined time, the wafer W is then passed from the thermal plate 140 again to the cooling plate 170 and cooled thereon, and transferred from the cooling plate 170 to the outside of the PEB unit 84 through the transfer-in/out port 180, with which a series of thermal processing ends.

Next, the configuration of the temperature setting apparatus 190 for performing temperature setting of the thermal plate 140 in the above-described PEB unit 84 will be described. The temperature setting apparatus 190 is composed of, for example, a general-purpose computer comprising a CPU and a memory, and connected to the temperature controller 142 for the thermal plate 140 as shown in FIG. 5 and FIG. 7.

Figure 8:
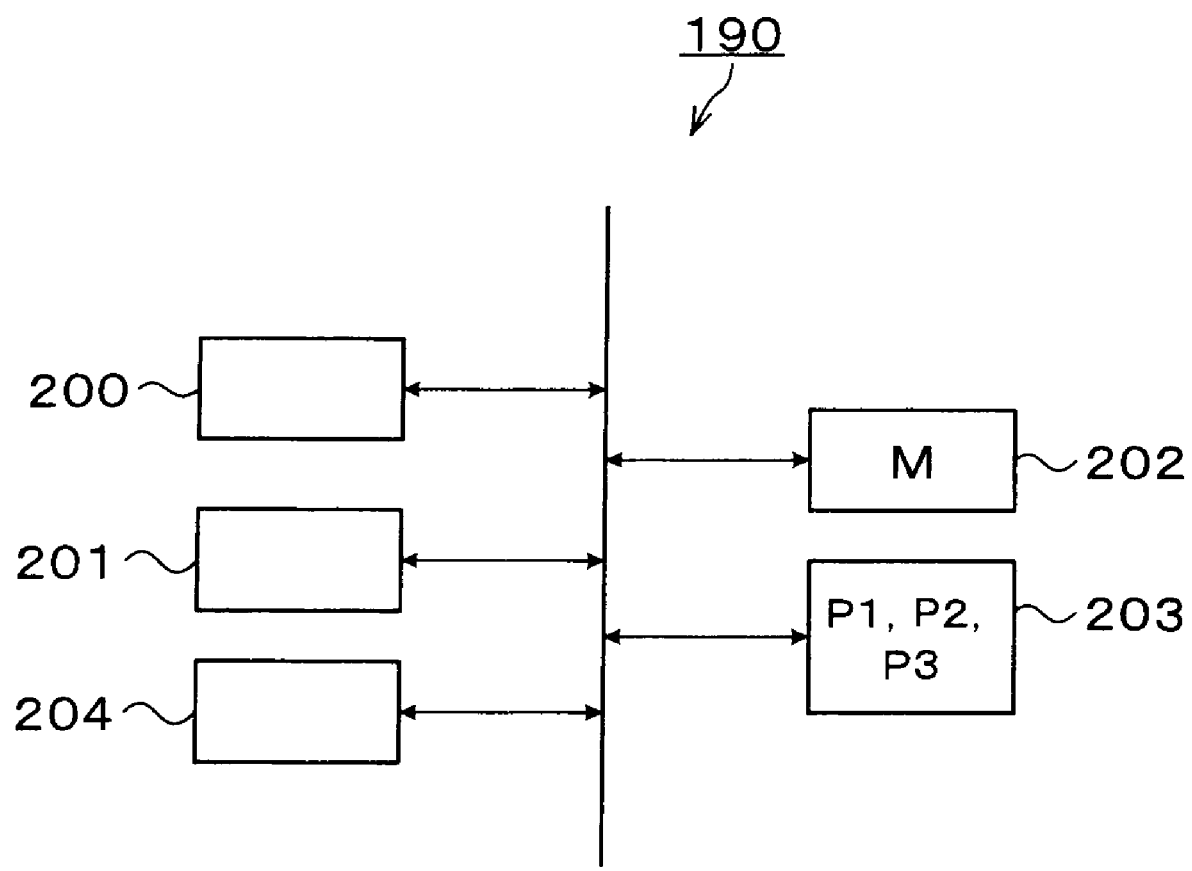
FIG. 8 is a block diagram showing a configuration of a temperature setting apparatus.

The temperature setting apparatus 190 comprises, for example, as shown in FIG. 8, a computing unit 200 for executing various kinds of programs; an input unit 201 for inputting, for example, various kinds of information for temperature setting; a data storage unit 202 for storing various kinds of information such as a calculation model M for calculating a temperature correction value; a program storage unit 203 for storing various kinds of programs for temperature setting; and a communication unit 204 for communicating with the temperature controller 142 to change the temperature setting of the thermal plate 140.

The program storage unit 203 stores, for example, a program P1 to calculate, from line width measured values of the resist pattern within the wafer, Zernike coefficients of a Zernike polynomial expressing a plurality of in-plane tendency components of the measured width. The above-described in-plane tendency components are made by decomposing the in-plane tendency of the measured line width within the wafer into a plurality of specific components.

Adding explanation about the Zernike polynomial, the Zernike polynomial is a complex function on a unit circle with a radius of 1 (practically used as a real function) which is often used in the optical field, and has arguments $(r, \theta)$ of polar coordinates. The Zernike polynomial is mainly used to analyze the aberration component of a lens in the optical field, and the wavefront aberration is decomposed using the Zernike polynomial, whereby aberration components based on the shape of each independent wavefront, for example, a mount shape, a saddle shape, or the like can be known.

In this embodiment, the line width measured values at many points within the wafer are expressed in the height direction above the wafer surface so that the line width tendency within the wafer is grasped as a circular wavefront. The Zernike polynomial is then used to decompose the variation tendency of the line width within the wafer (in-plane tendency), for example, into a plurality of in-plane tendency components, such as a deviation component in the Z-direction being the vertical direction, a gradient component in the X-direction, a gradient component in the Y-direction, and a curvature component convexly curving or concavely curving, so that the magnitude of each in-plane tendency component is expressed by the Zernike coefficient Zn.

The Zernike coefficient Zn indicating each in-plane tendency component can be expressed by following expressions using the arguments $(r, \theta)$ of polar coordinates.

Z1 (1)
Z2 ($r \cdot \cos \theta$)
Z3 ($r \cdot \sin \theta$)
Z4 ($2r^2 - 1$)
Z5 ($r^2 \cdot \cos 2\theta$)
Z6 ($r^2 \cdot \sin 2\theta$)
Z7 (($3r^3 - 2r) \cdot \cos \theta$)
Z8 (($3r^3 - 2r) \cdot \sin \theta$)
Z9 ($6r^4 - 6r^2 + 1$)

Z10 ($r^3 \cdot \cos 3\theta$)
Z11 ($r^3 \cdot \sin 3\theta$)
Z12 (($4r^4-3r^2) \cdot \cos 2\theta$)
Z13 (($4r^4-3r^2) \cdot \sin 2\theta$)
Z14 (($10r^5-12r^3+3r) \cdot \cos \theta$)
Z15 (($10r^5-12r^3+3r) \cdot \sin \theta$)
Z16 ($20r^6-30r^4+12r^2-1$) and so on.

Figures 9, 10:
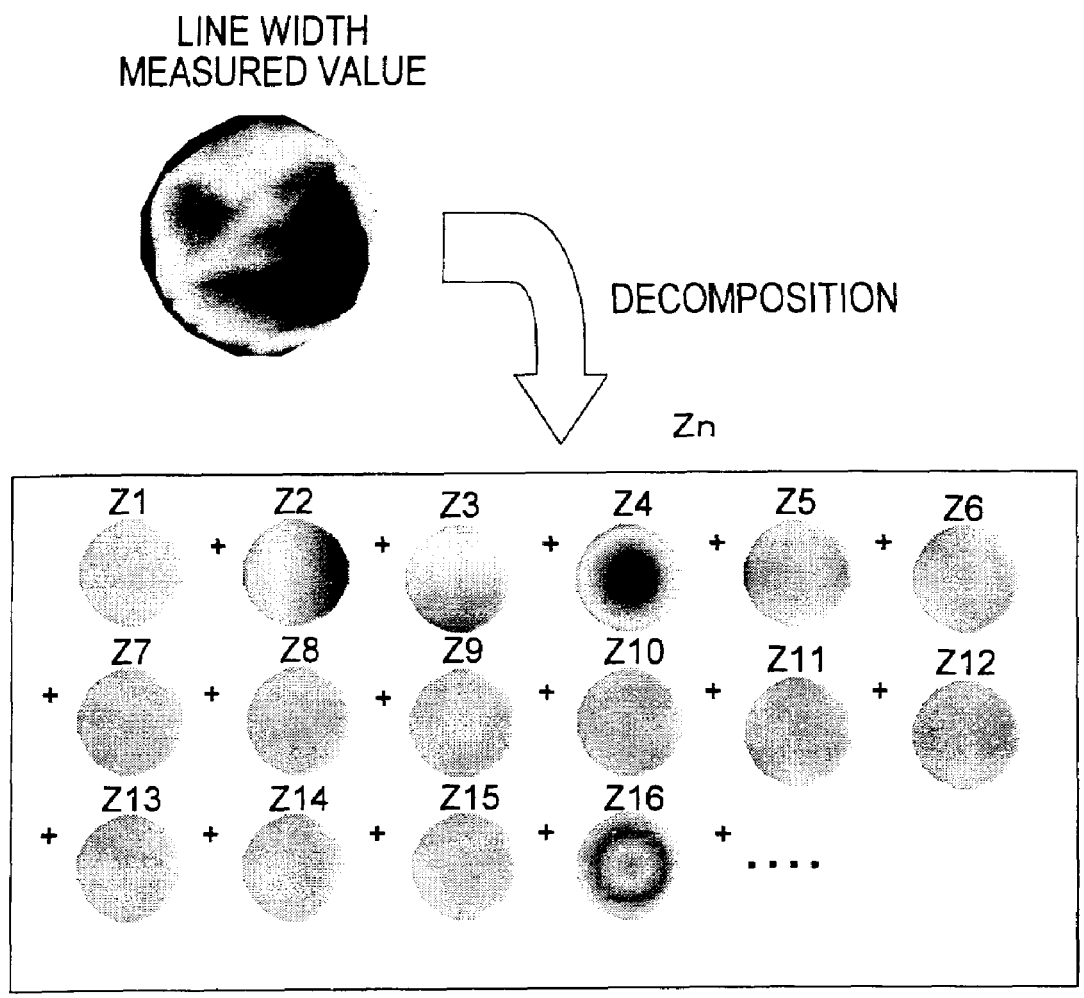
FIG. 9 is a schematic view showing an appearance in which the line width measured values are decomposed into a plurality of in-plane tendency components by the Zernike polynomial.
FIG. 10 is a determinant showing an example of the calculation model.

The Zernike polynomial can be used to decompose the line width measured values within the wafer in approximation to a plurality of Zernike coefficients Zn indicating various in-plane tendency components of the line width as shown in FIG. 9. For example, the Zernike coefficient Z1 indicates the line width average value within the wafer (the deviation component in the Z-direction), the Zernike coefficient Z2 indicates the gradient component in the X-direction, the Zernike coefficient Z3 indicates the gradient component in the Y-direction, and the Zernike coefficients Z4, Z9, and Z16 indicate the curvature components.

The program storage unit 202 stores, for example, a calculation model M. The calculation model M shows, for example, a correlation between the variation amount $\Delta Z$ of each in-plane tendency component of the line width within the wafer (the change amount of each Zernike coefficient) and an optimal temperature correction value $\Delta T$, and satisfies the following expression.

$$\Delta Z = M \cdot \Delta T \qquad (1)$$

The calculation model M can be used to calculate the temperature correction value $\Delta T$ from the Zernike coefficient Zn calculated from the measured line width within the wafer. Note that since it is only required that each Zernike coefficient Zn is 0 in order to eliminate each in-plane tendency component of the line width, a value obtained by multiplexing the calculated Zernike coefficient Zn by −1 is inputted as a correction value for the Zernike coefficient into the change amount $\Delta Z$ of the Zernike coefficient.

Specifically, the calculation model M is a determinant of n (the number of in-plane tendency components) rows by m (the number of thermal plate regions) columns expressed using the Zernike coefficients on a specific condition, for example, as shown in FIG. 10.

The calculation model M is made by raising the temperature of each of the thermal plate regions $R_1$ to $R_5$ in sequence by 1° C., measuring the line width variation amounts within the wafer in each case, calculating the variation amounts of the Zernike coefficients (the variation amounts of the in-plane tendency components) corresponding to the variation amounts of the line widths within the wafer, and expressing the variation amounts of the Zernike coefficients per unit temperature variation as elements $M_{i,j}$ of the determinant ($1 \leq i \leq n$, and $1 \leq j \leq m$ (m=5 in this embodiment)). Note that the in-plane tendency component that does not vary even when the temperature of the thermal plate region is raised by 1° C. creates a variation amount of the Zernike coefficient of 0, so that the element corresponding to that is 0.

For example, a first column $M_{i,1}$ (i=1 to n) of the calculation model M is composed of variation amounts of the Zernike coefficients when the thermal plate region $R_1$ of the thermal plate 140 is raised by 1° C., arranged in order from the top. A second column $M_{i,2}$ (i=1 to n) is composed of variation amounts of the Zernike coefficients when the thermal plate region $R_2$ of the thermal plate 140 is raised by 1° C., arranged in order from the top. A third column $M_{i,3}$ (i=1 to n) is composed of variation amounts of the Zernike coefficients when the thermal plate region $R_3$ of the thermal plate 140 is raised by 1° C., a fourth column $M_{i,4}$ (i=1 to n) is composed of variation amounts of the Zernike coefficients when the thermal plate region $R_4$ of the thermal plate 140 is raised by 1° C., and a fifth column $M_{i,5}$ (i=1 to n) is composed of variation amounts of the Zernike coefficients when the thermal plate region $R_5$ of the thermal plate 140 is raised by 1° C., arranged in order from the top in each case.

The program storage unit 203 stores, as shown in FIG. 8, for example, a calculation program P2 to calculate the temperature correction value $\Delta T$ of each of the thermal plate regions $R_1$ to $R_5$ using the relational expression (1) of the calculation model M, a setting change program P3 to change the existing temperature setting in the temperature controller 142 based on the calculated temperature correction value $\Delta T$, and so on. Note that the various kinds of programs for embodying the temperature setting process by the temperature setting apparatus 190 may be ones recorded in a recording medium such as a computer-readable CD, MO, or flash memory and installed from the recording medium into the temperature setting apparatus 190.

The calculation program P2 can calculate the optimal temperature correction value $\Delta T$ using the relational expression (1), for example, from the temperature correction value of the Zernike coefficient obtained from the result of the line width measurement. In this event, the optimal temperature correction value $\Delta T$ can be obtained from the variation amount $\Delta Z$ of the Zernike coefficient by multiplying both sides of the relational expression (1) by an inverse matrix $M^{-1}$ of the calculation model M to obtain the following expression (2), that is, $$\Delta T = M^{-1} \cdot \Delta Z \qquad (2)$$

Next, the temperature setting process by the temperature setting apparatus 190 configured as described above will be described. FIG. 11 shows a flow of the temperature setting process.

First of all, the wafer W for which a series of photolithography process has been performed in the coating and developing treatment system 1 is transferred into the line width measuring unit 110, where the line width of the resist pattern on the wafer W is measured (Step S1 in FIG. 11). In this event, the line width is measured at a plurality of measurement points Q within the wafer to obtain the line widths in the wafer regions $W_1$ to $W_5$ corresponding to the thermal plate regions $R_1$ to $R_5$ of the thermal plate 140.

Subsequently, the result of the line width measurement in the line width measuring unit 110 is outputted to the temperature setting apparatus 190. In the temperature setting apparatus 190, the Zernike coefficients Zn indicating the plurality of in-plane tendency components are calculated, for example, from measured values of the line widths in the wafer regions $W_1$ to $W_5$, that is, the measured values of the line widths within the wafer (Step S2 in FIG. 11). Subsequently, each of the correction values $\Delta Z1$ to $\Delta Zn$ of the calculated Zernike coefficients Zn (Zernike coefficient Zn×−1) is substituted into $\Delta Z$ in the relational expression (1) as shown in FIG. 12 to calculate the optimal temperature correction value $\Delta T$ ($\Delta T_1$ to $\Delta T_5$) for each of the thermal plate regions $R_1$ to $R_5$ using the calculation model M (Step S3 in FIG. 11). This calculation calculates the temperature correction values $\Delta T_1$ to $\Delta T_5$ which bring the Zernike coefficients Zn by the measured line widths to 0 to eliminate the in-plane tendency components of the line width.

Then, the information on each of the temperature correction values $\Delta T_1$ to $\Delta T_5$ is outputted from the communication unit 204 to the temperature controller 142, and the temperature correction value for each of the thermal plate regions $R_1$ to $R_5$ of the thermal plate 140 in the temperature controller 142 is changed, whereby a new set temperature is set (Step S4 in FIG. 11).

Note that the temperature setting process is realized by executing the various kinds of programs stored in the program storage unit 203 of the temperature setting apparatus 190.

According to the above embodiment, the line widths within the wafer formed by a series of wafer processing in the coating and developing treatment system 1 are measured, and the plurality of Zernike coefficients indicating the in-plane tendency components are calculated from the measured values of the line widths within the wafer. Then, the calculation model M indicating the correlation between the change amounts $\Delta Z$ of the Zernike coefficients and the temperature correction values $\Delta T$ is used to calculate the temperature correction values $\Delta T$ for the thermal plate regions $R_1$ to $R_5$ to bring the Zernike coefficients Zn calculated form the line width measured values to 0, so that the temperature setting of the thermal plate 140 is performed using the temperature correction values $\Delta T$.

In this case, the temperature correction of the thermal plate regions R1 to R5 is conducted to eliminate the final in-plane variations so that the line width of the resist pattern can be uniformly formed within the wafer. In addition, since the Zernike coefficients of the Zernike polynomial are used, the variation tendency of the line widths within the wafer can be decomposed into many in-plane tendency components so that the in-plane tendency components which can be improved by the temperature setting of the thermal plate 140 can be accurately grasped and eliminated, thereby drastically improving the uniformity of the final line width within the wafer. Particularly, since the PEB unit 84 greatly affects the final line width, the effect by correcting the temperature of the thermal plate 140 of the PEB unit 84 by the method is profound.

The temperature correction value $\Delta T$ for each of the thermal plate regions $R_1$ to $R_5$ calculated in the above embodiment may be set for each processing recipe which is determined by the combination of at least the thermal processing temperature in the PEB unit 84 and the kind of the resist solution. More specifically, for the processing recipe different either in the thermal processing temperature or the kind of the resist solution, a different calculation model M may be used to set a different temperature correction value $\Delta T$.

For example, as shown in FIG. 13, when a processing recipe H (a heating temperature T1 and a resist solution B1), a processing recipe I (a heating temperature T1 and a resist solution B2), a processing recipe J (a heating temperature T2 and a resist solution B1), and a processing recipe K (a heating temperature T2 and a resist solution B2) which are different in the heating temperature or the resist solution are set, a calculation model $M_1$, $M_2$, $M_3$, or $M_4$ is set for each of the processing recipes H to K so that the temperature correction value for each of the thermal plate regions $R_1$ to $R_5$ is calculated and set. In this case, even if the resist solution is changed and thereby the processing recipe is changed, the wafer W is thermally processed at an optimal temperature according to the processing recipe, thus ensuring the uniformity of the line width of the resist pattern within the wafer.

The calculation model M described in the above embodiment may be separated, for example, into a resist coefficient component $\alpha$ affected by the kind of the resist solution and a model component Mt affected by the processing conditions other than the resist solution as shown in the following expression (3).

$$\Delta Z = \alpha Mt \cdot \Delta T \qquad (3)$$

The processing conditions other than the resist solution referred here include, for example, the processing temperature, the processing time, the state of a processing apparatus, and the like which affect the line width. In this case, when the kind of the resist solution is changed, for example, according to the processing recipe, it is only necessary to change only the resist coefficient component $\alpha$ in the calculation model M. Besides, when the processing condition other than the resist solution such as the processing temperature is changed, it is only necessary to change only the model component Mt in the calculation model M. In this manner, the change of the resist solution and the change of the processing temperature can be flexibly and rapidly responded.

Further, the model component Mt may be separated into a model component Mt1 affected by the exposure processing conditions in the photolithography process and a model component Mt2 affected by the processing conditions other than the exposure processing conditions as shown in the following expression (4).

$$\Delta Z = \alpha Mt1 \cdot \alpha Mt2 \cdot \Delta T \qquad (4)$$

The exposure processing conditions referred here include, for example, exposure amounts (a dose amount and a focus amount), the condition of the aligner, and the like which affect the line width, and the processing conditions other than the exposure processing conditions include, for example, the heating time and the heating temperature of the heating processing in the PEB unit, the state of the PEB unit, and the like which affect the line width. In this case, for example, when a poor condition occurs in the aligner, the poor condition can be addressed by changing only the model component Mt1.

A preferred embodiment of the present invention has been described above with reference to the accompanying drawings, and the present invention is not limited to the embodiment. It should be understood that various changes and modifications within the scope of the spirit as set forth in claims are readily apparent to those skilled in the art, and those should also be covered by the technical scope of the present invention.

For example, while the temperature-set thermal plate 140 is divided into five regions in the above embodiment, any number of divisions can be selected. The shapes of the divided regions of the thermal plate 140 can also be arbitrarily selected.

While the above embodiment is an example in which the temperature setting of the thermal plate 140 of the PEB unit 84 is performed based on the line widths within the wafer, the present invention is also applicable to a case when performing temperature setting of a thermal plate for performing other thermal processing provided in a pre-baking unit and a post-baking unit, and temperature setting of a cooling plate in a cooling processing unit for cooling the wafer W. While the temperature setting of the thermal plate is performed to make the line width uniform within the wafer in the above embodiment, the temperature setting of one thermal processing plate in the PEB unit, pre-baking unit, or post-baking unit so as to uniform the processing state other than the line width within the wafer, such as the angle of the side wall in the groove of the resist pattern (the side wall angle) or the film thickness of the resist pattern within the wafer.

Further, while the temperature setting of the thermal plate is performed to uniform the line width of a pattern after the photolithography process and before the etching process in the above embodiment, the temperature setting of each thermal processing plate may be performed so as to uniform the line width or the side wall angle of the pattern after the etching process. Furthermore, the present invention is also applicable to temperature setting of a thermal processing plate for thermally processing substrates other than the wafer, such as an FPD (Flat Panel Display), a mask reticle for a photomask, and the like.

The present invention is useful in setting the temperature of a thermal processing plate for mounting and thermally processing a substrate thereon.

What is claimed is:

1. A temperature setting method of a thermal processing plate for mounting and thermally processing a substrate thereon, the thermal processing plate being divided into a plurality of regions, and a temperature being settable for each of the regions, and a temperature correction value for adjusting an in-plane temperature of the thermal processing plate being settable for each of the regions of the thermal processing plate, said method comprising the steps of:

measuring a processing state within a substrate, for a substrate for which a series of substrate processing including the thermal processing has been finished;

calculating Zernike coefficients of a Zernike polynomial indicating a plurality of in-plane tendency components of the processing state of the substrate based on the measured values of the processing state within the substrate;

calculating the temperature correction values for the regions of the thermal processing plate to bring the calculated Zernike coefficients close to 0 using a calculation model indicating a correlation between change amounts of the Zernike coefficients indicating the plurality of in-plane tendency components and the temperature correction values; and setting the temperature of each of the regions of the thermal processing plate based on each of the calculated temperature correction values.

2. The temperature setting method of a thermal processing plate as set forth in claim 1, wherein the calculation model is a determinant expressing variation mounts of the plurality of in-plane tendency components when the temperature of each of the regions of the thermal processing plate is raised by 1° C., by the Zernike coefficients of the Zernike polynomial.

3. The temperature setting method of a thermal processing plate as set forth in claim 1, wherein the series of substrate processing is processing to form a resist pattern on the substrate in a photolithography process.

4. The temperature setting method of a thermal processing plate as set forth in claim 3, wherein the processing state of the substrate to be measured is a line width of a resist pattern.

5. The temperature setting method of a thermal processing plate as set forth in claim 3, wherein the thermal processing is heating processing performed after exposure processing and before developing treatment.

6. The temperature setting method of a thermal processing plate as set forth in claim 3, wherein the calculation model is separated into a coefficient component determined by a resist solution and a model component determined by a processing condition other than the resist solution.

7. The temperature setting method of a thermal processing plate as set forth in claim 6, wherein the model component is further separated into a first model component determined by an exposure processing condition in the photolithography process and a second model component determined by a processing condition other than the exposure processing condition.

8. The temperature setting method of a thermal processing plate as set forth in claim 3, wherein the temperature correction value for each of the regions is set for each processing recipe determined by a combination of the thermal processing temperature and the kind of the resist solution.

9. A computer-readable recording medium recording a program thereon for causing a computer to execute a temperature setting method of a thermal processing plate, said temperature setting method comprising the steps of:

measuring a processing state within a substrate, for a substrate for which a series of substrate processing including the thermal processing has been finished;

calculating Zernike coefficients of a Zernike polynomial indicating a plurality of in-plane tendency components of the processing state of the substrate based on the measured values of the processing state within the substrate;

calculating the temperature correction values for the regions of the thermal processing plate to bring the calculated Zernike coefficients close to 0 using a calculation model indicating a correlation between change amounts of the Zernike coefficients indicating the plurality of in-plane tendency components and the temperature correction values; and setting the temperature of each of the regions of the thermal processing plate based on each of the calculated temperature correction values.

10. A temperature setting apparatus for a thermal processing plate for mounting and thermally processing a substrate thereon, wherein the thermal processing plate is divided into a plurality of regions, and a temperature is settable for each of the regions, wherein a temperature correction value for adjusting an in-plane temperature of the thermal processing plate is settable for each of the regions of the thermal processing plate, and wherein Zernike coefficients of a Zernike polynomial indicating a plurality of in-plane tendency components of the processing state of the substrate are calculated based on the processing state within a substrate, for a substrate for which a series of substrate processing including the thermal processing has been finished; the temperature correction values for the regions of the thermal processing plate to bring the calculated Zernike coefficients close to 0 are calculated using a calculation model indicating a correlation between change amounts of the Zernike coefficients indicating the plurality of in-plane tendency components and the temperature correction values; and the temperature of each of the regions of the thermal processing plate is set based on each of the calculated temperature correction values.

11. The temperature setting apparatus for a thermal processing plate as set forth in claim 10, wherein the calculation model is a determinant expressing variation mounts of the plurality of in-plane tendency components when the temperature of each of the regions of the thermal processing plate is raised by 1° C., by the Zernike coefficients of the Zernike polynomial.

12. The temperature setting apparatus for a thermal processing plate as set forth in claim 10, wherein the series of substrate processing is processing to form a resist pattern on the substrate in a photolithography process.

13. The temperature setting apparatus for a thermal processing plate as set forth in claim 12,
   wherein the processing state of the substrate after the series of substrate processing is a state of the line width of a resist pattern.

14. The temperature setting apparatus for a thermal processing plate as set forth in claim 12,
   wherein the thermal processing is heating processing performed after exposure processing and before developing treatment.

15. The temperature setting apparatus for a thermal processing plate as set forth in claim 12,
   wherein the calculation model is separated into a coefficient component determined by a resist solution and a model component determined by a processing condition other than the resist solution.

16. The temperature setting apparatus for a thermal processing plate as set forth in claim 15,
   wherein the model component is further separated into a first model component determined by an exposure processing condition in the photolithography process and a second model component determined by a processing condition other than the exposure processing condition.

17. The temperature setting apparatus for a thermal processing plate as set forth in claim 12,
   wherein the temperature correction value for each of the regions is set for each processing recipe determined by a combination of the thermal processing temperature and the kind of the resist solution.

* * * * *

UNITED STATES PATENT AND TRADEMARK OFFICE
CERTIFICATE OF CORRECTION

| | |
|---|---|
| PATENT NO. | : 7,715,952 B2 |
| APPLICATION NO. | : 11/858784 |
| DATED | : May 11, 2010 |
| INVENTOR(S) | : Jyousaka et al. |

Page 1 of 1

It is certified that error appears in the above-identified patent and that said Letters Patent is hereby corrected as shown below:

On the title page, Item (54) and Column 1, the title is incorrect. Item (54) and Column 1 should read:

-- (54) TEMPERATURE SETTING METHOD OF THERMAL PROCESSING PLATE, COMPUTER-READABLE RECORDING MEDIUM RECORDING PROGRAM THEREON, AND TEMPERATURE SETTING APPARATUS FOR THERMAL PROCESSING PLATE --

Signed and Sealed this

Third Day of August, 2010

David J. Kappos
*Director of the United States Patent and Trademark Office*